(12) United States Patent
Xu et al.

(10) Patent No.: US 8,799,340 B2
(45) Date of Patent: Aug. 5, 2014

(54) SYSTEMS AND METHODS FOR EFFICIENT DATA CHANNEL TESTING

(75) Inventors: Changyou Xu, Fremont, CA (US); Shaohua Yang, San Jose, CA (US); Kapil Gaba, Fremont, CA (US)

(73) Assignee: LSI Corporation, San Jose, CA (US)

( * ) Notice: Subject to any disclaimer, the term of this patent is extended or adjusted under 35 U.S.C. 154(b) by 463 days.

(21) Appl. No.: 13/280,023

(22) Filed: Oct. 24, 2011

(65) Prior Publication Data

US 2013/0103731 A1   Apr. 25, 2013

(51) Int. Cl.
*G06F 1/02* (2006.01)
*G11B 27/36* (2006.01)

(52) U.S. Cl.
USPC .............................. 708/250; 360/31

(58) Field of Classification Search
USPC ........................ 708/250, 252, 254
See application file for complete search history.

(56) References Cited

U.S. PATENT DOCUMENTS

| | | | |
|---|---|---|---|
| 7,346,817 B2 * | 3/2008 | Johnson | 714/720 |
| 7,990,642 B2 * | 8/2011 | Lee et al. | 360/31 |
| 2006/0294331 A1 * | 12/2006 | Forrer et al. | 711/163 |
| 2011/0026155 A1 * | 2/2011 | Bandic et al. | 360/48 |

OTHER PUBLICATIONS

U.S. Appl. No. 13/167,764, filed Jun. 24, 2011, Li et al.

\* cited by examiner

*Primary Examiner* — Chuong D Ngo
(74) *Attorney, Agent, or Firm* — Hamilton DeSanctis & Cha

(57) ABSTRACT

Various embodiments of the present invention provide systems and methods for data processing. For example, a data processing system is disclosed that includes: a data detector circuit, a pseudo-random sequence generator circuit, a decoder circuit, and a pseudo-random sequence reconstitution circuit. The data detector circuit is operable to apply a data detection algorithm to a first data set to yield a detected output. The pseudo-random sequence generator circuit is operable to generate an interim data sequence and to generate a second data set based upon a combination of the detected output and the interim data sequence. The decoder circuit is operable to apply a data decode algorithm to a derivative of the second data set to yield a third data set.

20 Claims, 4 Drawing Sheets

US 8,799,340 B2

SYSTEMS AND METHODS FOR EFFICIENT DATA CHANNEL TESTING

BACKGROUND OF THE INVENTION

The present inventions are related to systems and methods for system testing, and more particularly to systems and methods for testing a data processing system.

Various data processing circuits utilize known data for tuning read channel circuitry to improve data processing circuit performance. In many cases, a known data pattern is provided to the data processing circuit and an error rate corresponding to the known data is monitored while various read channel circuit parameters are modified to identify an appropriate set of circuit parameters. The process of introducing known data is complicated in read channel circuitry that allows for out of order processing as significant data must often be stored during variable stages of the data processing. Such a data storage requirement is costly in terms of both semiconductor area and power usage.

Hence, for at least the aforementioned reasons, there exists a need in the art for advanced systems and methods for data processing.

BRIEF SUMMARY OF THE INVENTION

The present inventions are related to systems and methods for system testing, and more particularly to systems and methods for testing a data processing system.

Various embodiments of the present invention provide data processing systems that include: a data detector circuit, a pseudo-random sequence generator circuit, a decoder circuit, and a pseudo-random sequence reconstitution circuit. The data detector circuit is operable to apply a data detection algorithm to a first data set to yield a detected output. The pseudo-random sequence generator circuit is operable to generate an interim data sequence and to generate a second data set based upon a combination of the detected output and the interim data sequence. The decoder circuit is operable to apply a data decode algorithm to a derivative of the second data set to yield a third data set. The pseudo-random sequence reconstitution circuit is operable to generate the interim data sequence and to generate a fourth data set based upon a combination of the a derivative of the third data set and the interim data sequence. In some instances of the aforementioned embodiments, application of the data detection algorithm to the first data set is guided by the fourth data set.

In some instances of the aforementioned embodiments, the data processing system is implemented as part of a storage device or a receiving device. In particular instances of the aforementioned embodiments, the data processing system is implemented as part of an integrated circuit. In one or more embodiments of the present invention, the data detection algorithm may be a maximum a posteriori data detection algorithm or a Viterbi detection algorithm. In particular instances of the aforementioned embodiments, the data decode algorithm is a low density parity check algorithm.

In one or more instances of the aforementioned embodiments, the data processing circuit further includes a schedule control circuit operable to store a seed value used to generate the interim data sequence, and to provide the seed value to the pseudo-random sequence reconstitution circuit when the pseudo-random sequence reconstitution circuit is operating on the derivative of the third data set that corresponds to the first data set. In some cases, generating the interim data sequence by the pseudo-random sequence reconstitution circuit includes loading the seed value into the pseudo-random sequence generator circuit, and generating the interim data sequence by the pseudo-random sequence generator circuit includes loading the seed value into the pseudo-random sequence generator circuit. In some cases, the a pseudo-random sequence generator circuit includes a first number of registers each holding values of the interim data sequence, the pseudo-random sequence reconstitution circuit a second number of registers each holding values of the interim data sequence, and the schedule control circuit is further operable to store the values from each of the number of registers corresponding to the end of a data set preceding the detected output. In some such cases, generating the interim data sequence by the pseudo-random sequence reconstitution circuit includes loading the seed value into the pseudo-random sequence reconstitution circuit, and loading the values from each of the number of registers corresponding to the end of a data set preceding the detected output into the number of registers in the pseudo-random sequence reconstitution circuit; and generating the interim data sequence by the pseudo-random sequence generator circuit includes loading the seed value into the pseudo-random sequence generator circuit, and loading the values from each of the number of registers corresponding to the end of a data set preceding the detected output into the number of registers in the pseudo-random sequence generator circuit.

In some instances of the aforementioned embodiments, generating the second data set based upon the combination of the detected output and the interim data sequence includes storing a value of the detected output in a corresponding position in the second data set where a corresponding value of the interim data sequence is a first value, and storing the negative of a value of the detected output in a corresponding position in the second data set where a corresponding value of the interim data sequence is a second value.

Other embodiments of the present invention provide methods for data processing that include: performing a data detection algorithm on a first data set to yield a detected output; generating a pseudo-random sequence by a pseudo-random sequence generating circuit; generating a second data set based upon a combination of the detected output and the pseudo-random sequence; performing a data decode algorithm on a derivative of the second data set to yield a third data set; re-generating the pseudo-random sequence by a pseudo-random sequence reconstitution circuit; and generating a fourth data set based upon a combination of the a derivative of the third data set and the interim data sequence. In such embodiments, performing the data detection algorithm on the first data set is guided by the fourth data set.

In some cases the methods further include storing a seed value used to generate the interim data sequence. In such cases, re-generating a pseudo-random sequence includes providing the seed value to a pseudo-random sequence reconstitution circuit when the pseudo-random sequence reconstitution circuit is operating on the derivative of the third data set that corresponds to the first data set. In various cases, the methods further include generating a pseudo-random sequence includes providing the seed value to a pseudo-random sequence generating circuit. In particular instances of the aforementioned embodiments, re-generating the pseudo-random sequence by the pseudo-random sequence reconstitution circuit includes loading the seed value into the pseudo-random sequence generator circuit; and generating the interim data sequence by the pseudo-random sequence generator circuit includes loading the seed value into the pseudo-random sequence generator circuit; and wherein generating the second data set based upon the combination of the detected output and the interim data sequence includes storing a value of the detected output in a corresponding position in the second data set where a corresponding value of the interim data sequence is a first value, and storing the negative of a value of the detected output in a corresponding position in the second data set where a corresponding value of the interim data sequence is a second value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for system testing, and more particularly to systems and methods for testing a data processing system.

Various embodiments of the present invention provide systems and methods for producing pseudo-random data sequences to a data processing circuit that are used to test and/or tune the data processing circuit. The circuitry used to generate the pseudo-random data sequences includes a seed generator circuit that allows for re-generating the same pseudo-random sequence for use in subsequent passes through a variable pass data processing circuit. As such, memory needed to store multiple pseudo-random sequences may be substantially eliminated while retaining the ability to test the data processing circuitry using pseudo-random sequences of data.

Figure 1:
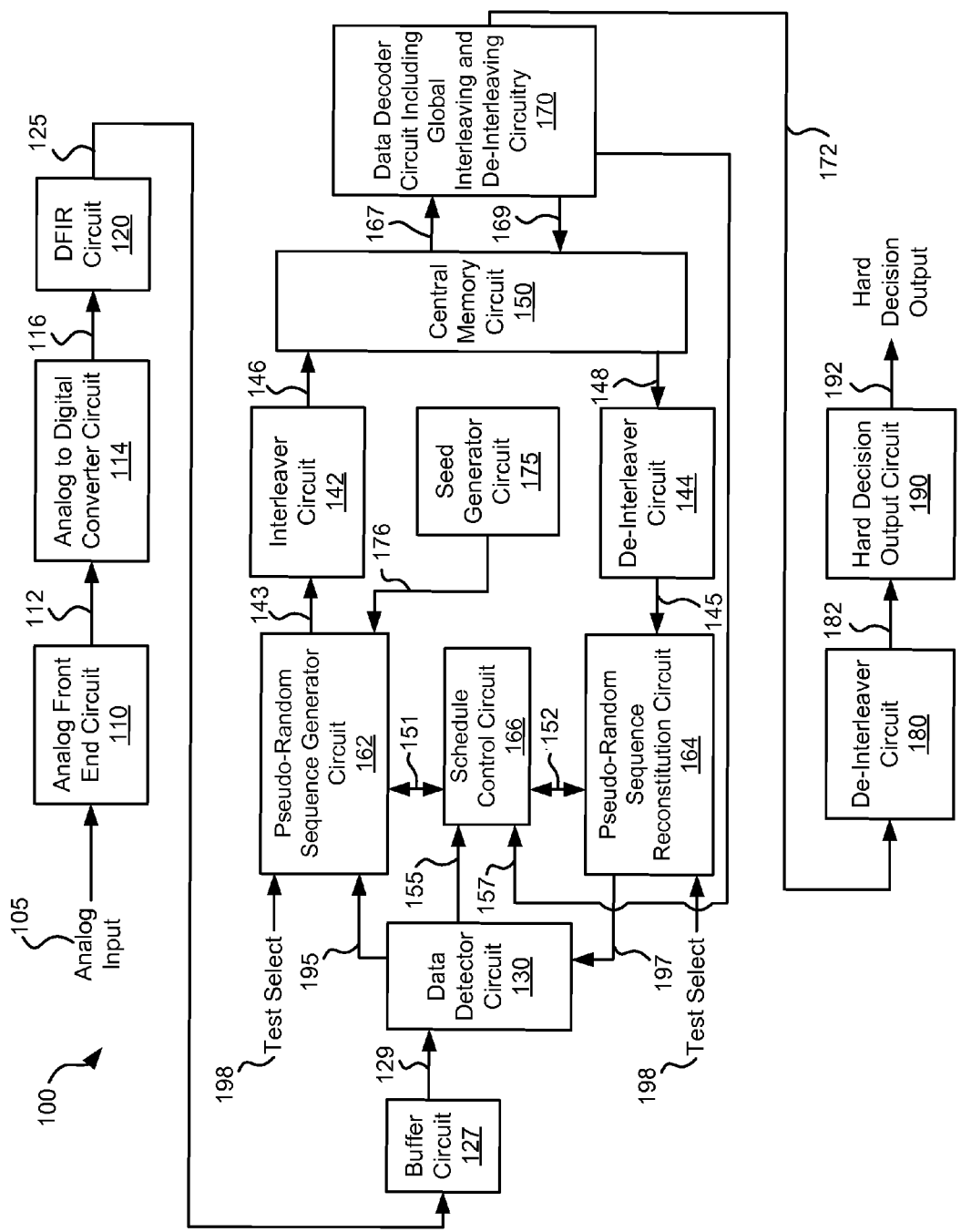
FIG. 1 shows a data processing circuit including seedable pseudo-random sequence generating circuitry in accordance with one or more embodiments of the present invention.

Turning to FIG. 1, a data processing circuit 100 is shown that includes seedable pseudo-random sequence generating circuitry in accordance with one or more embodiments of the present invention. The seedable pseudo-random sequence generating circuitry includes a seed generator circuit 175, a pseudo-random sequence generator circuit 162, and a pseudo-random sequence reconstitution circuit 164. The seedable pseudo-random sequence generating circuitry is operable to generate a pseudo-random sequence, and in turn to modify a detected output based on the pseudo-random sequence. The modified output is used to test the operation of data processing circuit 100 as data is passed from a data detector circuit 130 through a data decoder circuit 170. In some cases, the result of the testing is an error rate that may be used in relation to adjusting one or more parameters that govern the operation of data processing circuit 100. The generated pseudo-random sequence can be efficiently replicated to continue the testing and/or characterization processes as data is passed back from data decoder circuit 170 through data detector circuit 130.

Data processing circuit 100 includes an analog front end circuit 110 that receives an analog signal 105. Analog front end circuit 110 processes analog signal 105 and provides a processed analog signal 112 to an analog to digital converter circuit 114. Analog front end circuit 110 may include, but is not limited to, an analog filter and an amplifier circuit as are known in the art. Based upon the disclosure provided herein, one of ordinary skill in the art will recognize a variety of circuitry that may be included as part of analog front end circuit 110. In some cases, analog signal 105 is derived from a read/write head assembly (not shown) that is disposed in relation to a storage medium (not shown). In other cases, analog signal 105 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 105 may be derived.

Analog to digital converter circuit 114 converts processed analog signal 112 into a corresponding series of digital samples 116. Analog to digital converter circuit 114 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 116 are provided to an equalizer circuit 120. Equalizer circuit 120 applies an equalization algorithm to digital samples 116 to yield an equalized output 125. In some embodiments of the present invention, equalizer circuit 120 is a digital finite impulse response filter circuit as are known in the art. Equalized output 125 is provided to a buffer circuit 127 where it is stored until data detector circuit 130 is available for processing at which time a buffered output 129 is provided to data detector circuit 130.

Data detector circuit 130 is operable to apply a data detection algorithm to a received codeword or data set, and in some cases data detector circuit 130 can process two or more codewords in parallel. In some embodiments of the present invention, data detector circuit 130 is a Viterbi algorithm data detector circuit as are known in the art. In other embodiments of the present invention, data detector circuit 130 is a maximum a posteriori data detector circuit as are known in the art. Based upon the disclosure provided herein, one of ordinary skill in the art will recognize a variety of data detector circuits that may be used in relation to different embodiments of the present invention. Data detector circuit 130 is started based upon availability of a data set as buffered output 129 or a data set 197 derived from a central memory circuit 150.

Upon completion, data detector circuit 130 provides a detector status output 155 to a schedule control circuit 166. Similarly, as data decoder circuit 170 completes processing of a given data set, a decoder status output 157 is provided to schedule control circuit 166. Schedule control circuit 166 is responsible for monitoring the progress of processing a number of distinct data sets as they are passed between data detector circuit 130 and data decoder circuit 170. When a given data set is provided by data detector circuit 130 it is uniquely identified. Schedule control circuit 166 monitors this uniquely identified data set as it proceeds through one or more global iterations (i.e., passes through both data detector circuit 130 and data decoder circuit 170), and as more fully described below maintains a seed value 176 used to generate an original pseudo-random sequence so that the same pseudo-random sequence may be later regenerated to as part of reconstituting a data set.

The result of applying the data detection algorithm by data detector circuit 130 is a detected output 195 that is provided to pseudo-random sequence generator circuit 162. Detected output 195 is a series of soft data values indicating the likelihood that a particular bit position or group of bit positions has been properly detected. In some cases, the soft data values are log likelihood ratio (LLR) data values as are known in the art. When a test select input 198 is asserted high, pseudo-random sequence generator circuit 162 generates a pseudo-random sequence 143 that is based upon a seed value 176 from seed generator circuit 175 and detected output 195. Seed generator circuit 175 provides seed value 176 that is pseudo-randomly created. In turn, pseudo-random sequence generator circuit 162 generates an reference sequence of data corresponding to seed value 176. Generating the reference sequence of data corresponding to seed value 176 may be done using any approach to generating pseudo-random data known in the art. Seed value 176 is also provided to a schedule control circuit 166 via an input/output 151. The reference sequence of data corresponding to seed value 176 is modified using detected output 195 to yield pseudo-random sequence 143 in accordance with the following pseudo-code:

```
For(i=0 to SEQUENCE LENGTH LESS 1)
{
    If (reference sequence[i] == 0)
    {
        pseudo-random sequence[i] 143 = +(detected output[i] 195)
    }
    Else If (reference sequence[i] == 1)
    {
        pseudo-random sequence[i] 143 = −(detected output[i] 195)
    }
}
```

This process of modifying the reference sequence of data corresponding to seed value 176 to yield pseudo-random sequence 143 results in a valid codeword that can be processed by data decoder circuit 170.

In contrast, when test select input 198 is asserted low, a pseudo-random sequence 143 is set equal to detected output 195 in accordance with the following pseudo-code:

```
For(i=0 to SEQUENCE LENGTH LESS 1)
{
    pseudo-random sequence[i] 143 = +(detected output[i] 195)
}
```

Pseudo-random sequence 143 is stored to central memory circuit 150 where it awaits processing by data decoder circuit 170. Before being stored to central memory circuit 150, pseudo-random sequence 143 is processed through a local interleaver circuit 142 that shuffles sub-portions (i.e., local chunks) of the data set included as pseudo-random sequence 143 and provides an interleaved codeword 146 that is stored to central memory circuit 150. Interleaver circuit 142 may be any circuit known in the art that is capable of shuffling data sets to yield a re-arranged data set. Interleaved codeword 146 is stored to central memory circuit 150.

Once data decoder circuit 170 is available, a previously stored pseudo-random sequence 143 is accessed from central memory circuit 150 as a decoder input 167, globally interleaved, and the data decode algorithm is applied. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. As the data decode algorithm completes on a given data set, it is determined whether the decode algorithm converged (i.e., the resulting data set matches the originally written data set as indicated by the lack of parity errors). Where it is determined that the decode algorithm converged, the resulting decoded data set is provided as a hard decision output 172 to a de-interleaver circuit 180. De-interleaver circuit 180 rearranges the data to reverse both the global and local interleaving applied to the data to yield a de-interleaved output 182. De-interleaved output 182 is provided to a hard decision output circuit 190. Hard decision output circuit 190 is operable to re-order data sets that may complete out of order back into their original order. The originally ordered data sets are then provided as a hard decision output 192.

Alternatively, where it is determined that the data decode algorithm failed to converge (i.e., there are remaining parity errors), the completed data set is globally de-interleaved and written back to central memory circuit 150 as a decoder output 169. In addition, the completion of the data decode algorithm by data decoder circuit 170 and storage of decoder output 169 to central memory circuit 150 is signaled to schedule control circuit 166 by asserting decoder status output 157. This allows schedule control circuit 166 to assure that seed value 176 used in relation to generating pseudo-random sequence 143 can be used in relation to reconstituting a corresponding decoder output 169 accessed from central memory circuit 150.

Once data detector circuit 130 is available, a previously stored decoder output 148 is accessed from central memory circuit 150 and locally de-interleaved by a de-interleaver circuit 144. De-interleaver circuit 144 re-arranges decoder output 148 to reverse the shuffling originally performed by interleaver circuit 142. A resulting de-interleaved output 145 is provided to pseudo-random sequence re-constitution circuit 164.

When test select input 198 is asserted high, pseudo-random sequence reconstitution circuit 164 receives via an input/output 152 the original seed value 176 used by pseudo-random sequence generator circuit 162 to generate the pseudo-random sequence from which de-interleaved output 145 is derived. In turn, pseudo-random sequence reconstitution circuit 164 generates an reference sequence of data corresponding to the seed value received via input/output 152. As the received seed value is the same as seed value 176, the reference sequence of data generated by pseudo-random sequence reconstitution circuit 164 is the same as the reference sequence of data previously generated by pseudo-random sequence generator circuit 162. The reference sequence of data generated based on the received seed value is modified using de-interleaved output 145 to yield a reconstituted pseudo-random sequence that is provided to data detector circuit 130 as data set 197. Modification of the reference sequence of data generated based on the received seed value and de-interleaved output 145 is done in accordance with the following pseudo-code:

```
For(i=0 to SEQUENCE LENGTH LESS 1)
{
    If (reference sequence[i] == 0)
    {
        data set[i] 197 = +(de-interleaved output[i] 145)
    }
    Else If (reference sequence[i] == 1)
    {
        data set[i] 197 = -(de-interleaved output[i] 145)
    }
}
```

In contrast, when test select input 198 is asserted low, data set 197 is set equal to de-interleaved output 145 in accordance with the following pseudo-code:

```
For(i=0 to SEQUENCE LENGTH LESS 1)
{
    data set[i] 197 = +(de-interleaved output[i] 145)
}
```

The aforementioned approach to pseudo-random sequence generation uses a dynamic seeding approach where seed value 176 is dynamically generating during processing of a data set, and seed value 176 is maintained by schedule control circuit 166 for later reconstitution. Schedule control circuit 166 does not need to store seed values for all possible data sets, but rather the dynamic processing allows schedule control circuit 166 to store only seeds for data sets currently being processed. As data processing circuit 100 is only actively processing a few data sets at any given time, only a limited number of seed values are stored.

In some instances of data processing circuit 100, only one seed value is maintained by schedule control circuit 166. For example, data processing circuit 100 may process four data sets in parallel with one of the data sets uniquely identified by a "TAG 0" designator and using a "SEED 0" value generated by seed generator circuit 175. The second data set is uniquely identified by a "TAG 1", the third data set is uniquely identified by a "TAG 2", and the fourth data set is uniquely identified by a "TAG 3". The seed values used in relation to the second, third and fourth data sets are arithmetically or logically derived from SEED 0. For example, a seed corresponding to the data set identified as TAG 1 may be circularly shifted by a first number of shifts; a seed corresponding to the data set identified as TAG 2 may be circularly shifted by a second number of shifts; and a seed corresponding to the data set identified as TAG 3 may be circularly shifted by a third number of shifts. As such, different seed values may be generated for each data set while schedule control circuit 166 is only required to maintain one seed value. When reconstitution is performed for a given data set, the appropriate seed value is regenerated using the SEED 0 value and reversing the arithmetic or logical relationship to yield the seed value corresponding to the particular data set.

In some embodiments of the present invention, it is useful for succeeding pseudo-random sequences being processed through data processing circuit 100 to have a continuous pseudo-random sequence. In such cases, the register values in pseudo-random sequence generator circuit 162 at the end of processing a preceding data set are stored to schedule control circuit 166 along with a seed value and a data set identifier for use in relation to generating a pseudo-random sequence for the next data set, and for later reconstitution related to a data set identified by data set identifier. One approach for providing a continuous pseudo-random sequence by schedule control circuit 166 is discussed in relation to FIG. 2 below.

Figure 2:
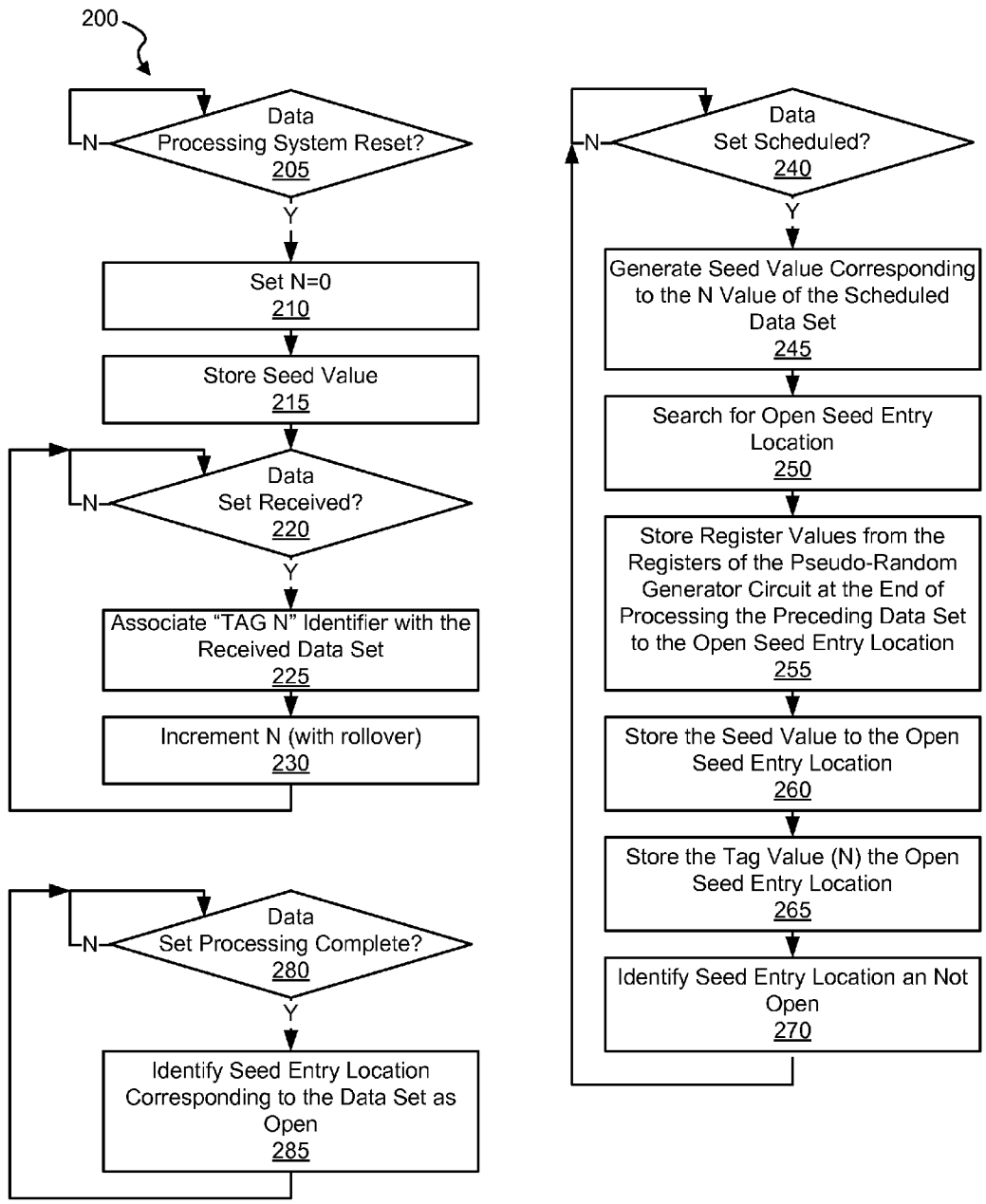
FIG. 2 is a flow diagram showing a method for seed generation in accordance with various embodiments of the present invention.

Turning to FIG. 2, a flow diagram 200 shows a method for seed generation in accordance with various embodiments of the present invention. The seed generation provides for a continuous pseudo-random sequence spanning successive data sets. Following flow diagram 200, it is determined whether a data processing system is reset (block 205). The reset may be a soft reset or a hard reset. Where a reset is received (block 205), a data set identifier (N) is initialized to zero (block 210), and a seed value for the data set identified with the zero tag is stored (block 215). It is determined whether a new data set is received (block 220). Where a new data set is received (block 220), a TAG N value is associated with the received data set (block 225) and the data set identifier (N) is incremented (block 230). The incrementing of the data set identifier rolls over after a pre-defined count value is achieved. This process of associating data set identifiers with received data sets is continued as new data sets are received (blocks 220, 225, 230).

In parallel, it is determined whether a data set is scheduled for processing (block 240). A Seed value corresponding to the data set identifier (N) of the scheduled data set (block 245). This may be done, for example, by receiving a new seed value from seed generator circuit 175, or by arithmetically or logically generating a seed value based on the seed value corresponding to an initial seed value. A search is done to identify an open seed entry location in schedule control circuit 166 (block 250). In some cases, an open seed entry is identified as a location that has been written with all 0s. Based upon the disclosure provided herein, one of ordinary skill in the art will recognize other approaches for indicating and/or identifying an open seed entry location. Register values of the registers included in pseudo-random sequence generator circuit 162 at the end of processing a preceding data set are stored to the identified open seed entry location (block 255), and the seed value and data set identifier (N) for the current data set are also stored to the identified open seed entry location (blocks 260, 265). The identified open seed entry location is identified as not open (block 270). This identification of the open seed value location may be a natural effect of writing information to the location. Based upon the disclosure provided herein, one of ordinary skill in the art will recognize other approaches for indicating and/or identifying an open seed entry location is no longer open. The processes of blocks 240-270 are repeated as each successive data set is received.

In parallel, it is determined whether data set processing is complete (block 280). A data set may complete either by convergence of the data decode algorithm applied by data decoder circuit, or may occur when a data set times out. Where processing of a data set is complete (block 280), the seed entry location used in relation to processing the data set is identified as open (block 285). This identification may be accomplished by writing the location with all 0s. Based upon the disclosure provided herein, one of ordinary skill in the art will recognize other approaches for indicating and/or identifying an open seed entry location.

Figure 3:
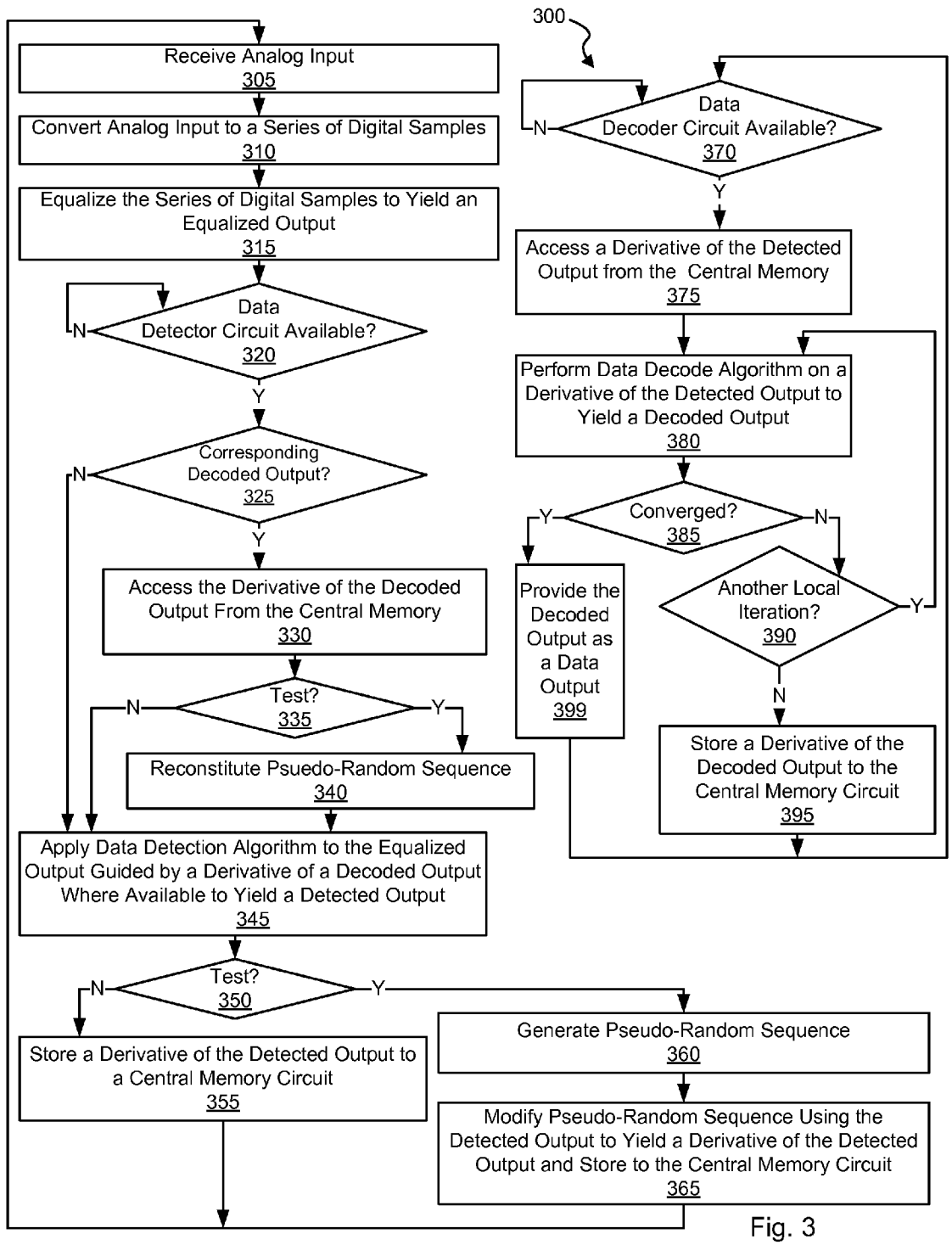
FIG. 3 is a flow diagram showing a method for seedable pseudo-random sequence generation in accordance with various embodiments of the present invention.

Turning to FIG. 3, a flow diagram 300 shows a method for seedable pseudo-random sequence generation in accordance with various embodiments of the present invention. Following flow diagram 300, an analog input signal is received (block 305). The analog input may be derived from, for example, a storage medium or a data transmission channel. Based upon the disclosure provided herein, one of ordinary skill in the art will recognize a variety of sources of the analog input. The analog input is converted to a series of digital samples (block 310). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 315). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

It is determined whether a data detector circuit is available (block 320). Where a data detector circuit is available (block 320), it is determined whether a decoded output corresponding to the received data set is available from a central memory (block 325). Where a corresponding decoded output is available (block 325), a derivative of the decoded output is accessed from the central memory (block 330). It is determined whether a test has been selected (block 335). Where a test has been selected (block 335), a pseudo-random sequence originally used to generate the data from which decoded output is derived is reconstituted (block 340). Reconstitution includes seeding a pseudo-random generation circuit with the same seed value used originally to generate the pseudo-random sequence from which the decoded output is derived. In some cases, where a continuous pseudo-random sequence is desired, reconstitution further includes restoring the registers of the pseudo-random generation circuit to the values they held at the end of generating a pseudo-random sequence for a preceding data set. Such a continuous pseudo-random sequence may be generated using the approach discussed above in relation to FIG. 2. Reconstituting the pseudo-random sequence further includes modifying the derivative of the decoded output in accordance with the following pseudo-code:

```
For(i=0 to SEQUENCE LENGTH LESS 1)
{
   If (pseudo-random sequence[i] == 0)
   {
      derivative of the decoded output[i] =
      +(derivative of the decoded output[i])
   }
   Else If (pseudo-random sequence[i] == 1)
   {
      derivative of the decoded output[i] =
      -(derivative of the decoded output[i])
   }
}
```

Either where the pseudo-random sequence is reconstituted (block 340), a test is not selected (block 335), or a corresponding decoded output does not exist (block 325), a data detection algorithm is applied to the equalized output guided by a derivative of the decoded output where available to yield a detected output (block 345). In some embodiments of the present invention, the data detection algorithm is a Viterbi detection algorithm or a maximum a posteriori detection algorithm.

It is determined whether a test has been selected (block 350). Where a test has been selected (block 350), a pseudo random sequence is generated (block 360). Generation of the pseudo-random sequence includes receiving a seed value and generating a pseudo-random sequence based on the seed value. In some cases, the registers in a pseudo-random sequence generation circuit are reset before the seed value is applied to generate the pseudo-random sequence. Such an approach yields a non-continuous pseudo-random sequence. In other cases a continuous pseudo-random sequence is desired. In such cases, the register values of the pseudo-random sequence generation circuit at the end of a preceding data set are stored and subsequently restored to the pseudo-random sequence generation circuit for a subsequent data set. Such an approach may be done using the method described above in relation to FIG. 2.

The generated pseudo-random sequence is modified using the detected output to yield a derivative of the detected output (block 365). The derivative of the detected output may be generated in accordance with the following pseudo-code:

```
For(i=0 to SEQUENCE LENGTH LESS 1)
{
   If (pseudo-random sequence[i] == 0)
   {
      derivative of the detected output[i] = +(detected output[i])
   }
   Else If (pseudo-random sequence[i] == 1)
   {
      derivative of the detected output[i] = -(detected output[i])
   }
}
```

The derivative of the detected output is stored to a central memory circuit. Alternatively, where a test has not been selected (block 350), a derivative of the detected output (e.g., a locally interleaved version of the detected output) is stored to the central memory circuit.

In parallel to the previously discussed processing, it is determined whether a data decoder circuit is available (block 370). Where the data decoder circuit is available (block 370) a previously stored derivative of the detected output is accessed from the central memory (block 375). A data decode algorithm is applied to the derivative of the detected output to yield a decoded output (block 380). It is determined whether the decode algorithm converged (i.e., the original data set is identified) (block 385). Where the data decode algorithm converged (block 385), the decoded output is provided as a data output (block 399). Otherwise, where the data decode algorithm failed to converge (block 385), it is determined whether another local iteration is to be applied (block 390). Where another local iteration is to be applied (block 390), the processes of blocks 380, 385, 390 are repeated. Alternatively, where another local iteration is not to be applied (block 390), a derivative of the decoded output (e.g., the decoded output after some de-interleaving) is stored to the central memory circuit 395).

Figure 4:
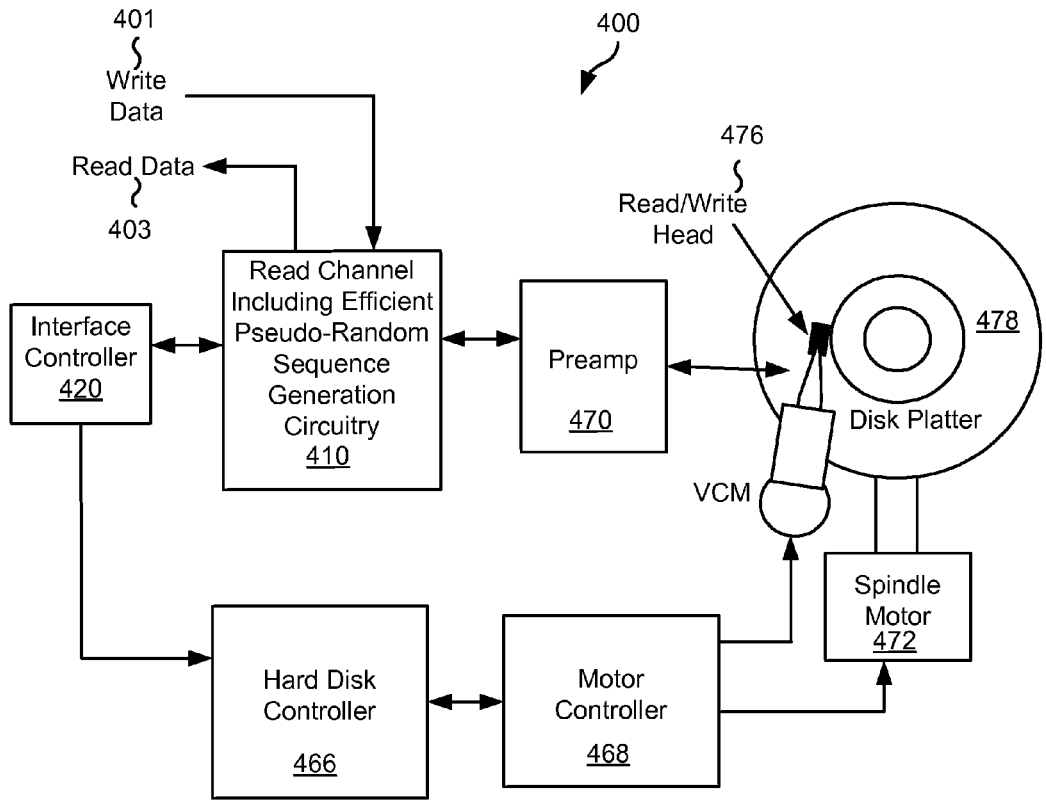
FIG. 4 shows a storage device including a read channel having efficient pseudo-random sequence generating circuitry in accordance with one or more embodiments of the present invention.

Turning to FIG. 4, a storage device is shown that includes a read channel circuit 410 having efficient pseudo-random sequence generation circuitry in accordance with some embodiments of the present invention. Storage system 400 may be, for example, a hard disk drive. Storage system 400 also includes a preamplifier 470, an interface controller 420, a hard disk controller 466, a motor controller 468, a spindle motor 472, a disk platter 478, and a read/write head assembly 476. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with either a longitudinal or a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel circuit 410 via preamplifier 470. Preamplifier 470 is operable to amplify the minute analog signals accessed from disk platter 478. In turn, read channel circuit 410 decodes and digitizes the received analog signal to recreate the information originally written to disk platter 478. This data is provided as read data 403 to a receiving circuit. A write operation is substantially the opposite of the preceding read operation with write data 401 being provided to read channel circuit 410. This data is then encoded and written to disk platter 478.

During a test operation, the efficient pseudo-random sequence generation circuitry generates pseudo-random sequences that are processed to determine an error rate. This error rate is monitored as one or more circuit parameters are adjusted to identify a set of circuit parameters that yield an acceptable error rate. In this process the pseudo-random sequence generation circuitry is passed between the data decoder and data detector circuit via a central memory allowing for variation between the number of processing iterations that are applied to different data sets. The efficient pseudo-random sequence generation circuitry is included that allows for testing the data processing circuitry using pseudo-random data sequences. The efficient pseudo-random sequence generation circuitry may be implemented similar to that discussed above in relation to FIGS. 1 and 2, and/or may operate similar to that discussed in above in relation to FIGS. 3 and 2.

It should be noted that storage system 400 may be integrated into a larger storage system such as, for example, a RAID (redundant array of inexpensive disks or redundant array of independent disks) based storage system. It should also be noted that various functions or blocks of storage system 400 may be implemented in either software or firmware, while other functions or blocks are implemented in hardware.

Figure 5:
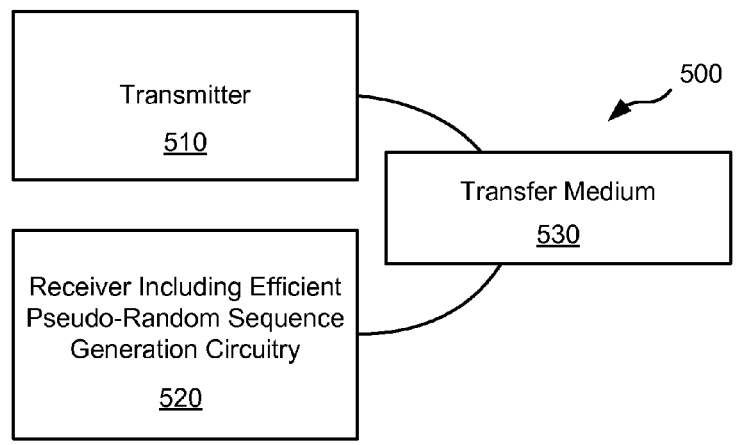
FIG. 5 shows a data transmission system including a receiver having efficient pseudo-random sequence generating circuitry in accordance with some embodiments of the present invention.

Turning to FIG. 5, a data transmission system 500 is shown that includes a receiver 520 having efficient pseudo-random sequence generation circuitry in accordance with some embodiments of the present invention. Data transmission system 500 includes a transmitter 510 that is operable to transmit encoded information via a transfer medium 530 as is known in the art. The encoded data is received from transfer medium 530 by receiver 520. Receiver 520 incorporates efficient pseudo-random sequence generation circuitry. While processing received data, received data is converted from an analog signal to a series of corresponding digital samples, and the digital samples are equalized to yield an equalized output. The equalized output is then provided to a data processing circuit including both a data detector circuit and a data decoder circuit. Data is passed between the data decoder and data detector circuit via a central memory allowing for variation between the number of processing iterations that are applied to different data sets. An efficient pseudo-random sequence generation circuitry is included that allows for testing the data processing circuitry using pseudo-random data sequences. The efficient pseudo-random sequence generation circuitry may be implemented similar to that discussed above in relation to FIGS. 1 and 2, and/or may operate similar to that discussed in above in relation to FIGS. 3 and 2.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a data detector circuit operable to apply a data detection algorithm to a first data set to yield a detected output;
   a pseudo-random sequence generator circuit operable to generate an interim data sequence and to generate a second data set based upon a combination of the detected output and the interim data sequence;
   a decoder circuit operable to apply a data decode algorithm to a derivative of the second data set to yield a third data set; and
   a pseudo-random sequence reconstitution circuit operable to generate the interim data sequence and to generate a fourth data set based upon a combination of the a derivative of the third data set and the interim data sequence.

2. The data processing system of claim 1, wherein application of the data detection algorithm to the first data set is guided by the fourth data set.

3. The data processing circuit of claim 1, wherein the data processing system is implemented as part of a device selected from a group consisting of: a storage device and a receiving device.

4. The data processing system of claim 1, wherein the data processing system is implemented as part of an integrated circuit.

5. The data processing system of claim 1, wherein the data detection algorithm is selected from a group consisting of: maximum a posteriori data detection algorithm and a Viterbi detection algorithm.

6. The data processing system of claim 1, wherein the data processing circuit further comprises:

a schedule control circuit operable to store a seed value used to generate the interim data sequence, and to provide the seed value to the pseudo-random sequence reconstitution circuit when the pseudo-random sequence reconstitution circuit is operating on the derivative of the third data set that corresponds to the first data set.

7. The data processing circuit of claim 6, wherein generating the interim data sequence by the pseudo-random sequence reconstitution circuit includes loading the seed value into the pseudo-random sequence generator circuit; and wherein generating the interim data sequence by the pseudo-random sequence generator circuit includes loading the seed value into the pseudo-random sequence generator circuit.

8. The data processing circuit of claim 6, wherein:
the a pseudo-random sequence generator circuit includes a first number of registers each holding values of the interim data sequence;
the pseudo-random sequence reconstitution circuit a second number of registers each holding values of the interim data sequence; and
the schedule control circuit is further operable to store the values from each of the number of registers corresponding to the end of a data set preceding the detected output.

9. The data processing circuit of claim 8, wherein generating the interim data sequence by the pseudo-random sequence reconstitution circuit includes loading the seed value into the pseudo-random sequence reconstitution circuit, and loading the values from each of the number of registers corresponding to the end of a data set preceding the detected output into the number of registers in the pseudo-random sequence reconstitution circuit; and generating the interim data sequence by the pseudo-random sequence generator circuit includes loading the seed value into the pseudo-random sequence generator circuit, and loading the values from each of the number of registers corresponding to the end of a data set preceding the detected output into the number of registers in the pseudo-random sequence generator circuit.

10. The data processing circuit of claim 1, wherein generating the second data set based upon the combination of the detected output and the interim data sequence includes storing a value of the detected output in a corresponding position in the second data set where a corresponding value of the interim data sequence is a first value, and storing the negative of a value of the detected output in a corresponding position in the second data set where a corresponding value of the interim data sequence is a second value.

11. The data processing circuit of claim 1, wherein the data decode algorithm is a low density parity check algorithm.

12. A method for data processing, the method comprising:
performing a data detection algorithm on a first data set to yield a detected output;
generating a pseudo-random sequence by a pseudo-random sequence generating circuit;
generating a second data set based upon a combination of the detected output and the pseudo-random sequence;
performing a data decode algorithm on a derivative of the second data set to yield a third data set;
re-generating the pseudo-random sequence by a pseudo-random sequence reconstitution circuit;
generating a fourth data set based upon a combination of the a derivative of the third data set and the interim data sequence; and
wherein performing the data detection algorithm on the first data set is guided by the fourth data set.

13. The method of claim 12, the method further comprising:
storing a seed value used to generate the interim data sequence; and
wherein re-generating a pseudo-random sequence includes providing the seed value to a pseudo-random sequence reconstitution circuit when the pseudo-random sequence reconstitution circuit is operating on the derivative of the third data set that corresponds to the first data set.

14. The method of claim 12, the method further comprising:
storing a seed value used to generate the interim data sequence; and
wherein generating a pseudo-random sequence includes providing the seed value to a pseudo-random sequence generating circuit.

15. The method of claim 12, wherein re-generating the pseudo-random sequence by the pseudo-random sequence reconstitution circuit includes loading the seed value into the pseudo-random sequence generator circuit; and wherein generating the interim data sequence by the pseudo-random sequence generator circuit includes loading the seed value into the pseudo-random sequence generator circuit; and wherein generating the second data set based upon the combination of the detected output and the interim data sequence includes storing a value of the detected output in a corresponding position in the second data set where a corresponding value of the interim data sequence is a first value, and storing the negative of a value of the detected output in a corresponding position in the second data set where a corresponding value of the interim data sequence is a second value.

16. A storage device, the storage device comprising:
a storage medium;
a head assembly disposed in relation to the storage medium and operable to provide a sensed signal corresponding to information on the storage medium;
a read channel circuit including:
an analog to digital converter circuit operable to sample an analog signal derived from the sensed signal to yield a series of digital samples;
an equalizer circuit operable to equalize the digital samples to yield a first data set;
a data detector circuit operable to apply a data detection algorithm to the first data set to yield a detected output;
a pseudo-random sequence generator circuit operable to generate an interim data sequence and to generate a second data set based upon a combination of the detected output and the interim data sequence;
a decoder circuit operable to apply a data decode algorithm to a derivative of the second data set to yield a third data set; and
a pseudo-random sequence reconstitution circuit operable to generate the interim data sequence and to generate a fourth data set based upon a combination of the a derivative of the third data set and the interim data sequence.

17. The storage device of claim 16, wherein application of the data detection algorithm to the first data set is guided by the fourth data set.

18. The storage device of claim 16, wherein the storage device further comprises:
a schedule control circuit operable to store a seed value used to generate the interim data sequence, and to provide the seed value to the pseudo-random sequence reconstitution circuit when the pseudo-random sequence reconstitution circuit is operating on the derivative of the third data set that corresponds to the first data set.

19. The storage device of claim 18, wherein generating the interim data sequence by the pseudo-random sequence reconstitution circuit includes loading the seed value into the pseudo-random sequence generator circuit; and wherein generating the interim data sequence by the pseudo-random sequence generator circuit includes loading the seed value into the pseudo-random sequence generator circuit.

20. The storage device of claim 19, wherein generating the second data set based upon the combination of the detected output and the interim data sequence includes storing a value of the detected output in a corresponding position in the second data set where a corresponding value of the interim data sequence is a first value, and storing the negative of a value of the detected output in a corresponding position in the second data set where a corresponding value of the interim data sequence is a second value.

* * * * *